(12) United States Patent
Marum et al.

(10) Patent No.: US 8,694,527 B2
(45) Date of Patent: Apr. 8, 2014

(54) SIMPLIFIED QUERY GENERATION FROM PRIOR QUERY RESULTS

(75) Inventors: Matthew G. Marum, Durham, NC (US); Samuel G. Padgett, Research Triangle Park, NC (US); Nirav S. Sheth, Durham, NC (US); Steven K. Speicher, Research Triangle Park, NC (US); Michael J. Tabb, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 12/828,271

(22) Filed: Jun. 30, 2010

(65) Prior Publication Data

US 2012/0005223 A1    Jan. 5, 2012

(51) Int. Cl.
*G06F 17/30* (2006.01)

(52) U.S. Cl.
USPC .......................................... 707/765

(58) Field of Classification Search
USPC .................................. 707/759–775
See application file for complete search history.

(56) References Cited

U.S. PATENT DOCUMENTS

| | | | |
|---|---|---|---|
| 6,581,056 B1* | 6/2003 | Rao | 1/1 |
| 6,671,681 B1* | 12/2003 | Emens et al. | 707/706 |
| 6,941,297 B2* | 9/2005 | Carmel et al. | 707/765 |
| 8,001,136 B1* | 8/2011 | Papachristou et al. | 707/758 |
| 8,122,046 B2* | 2/2012 | Chang et al. | 707/764 |
| 2004/0186827 A1* | 9/2004 | Anick et al. | 707/3 |
| 2005/0065914 A1* | 3/2005 | Chang et al. | 707/3 |
| 2005/0289100 A1* | 12/2005 | Dettinger et al. | 707/1 |
| 2010/0293196 A1* | 11/2010 | Roy et al. | 707/776 |

* cited by examiner

*Primary Examiner* — Fred I Ehichioya
*Assistant Examiner* — Michelle Owyang
(74) *Attorney, Agent, or Firm* — Steven M. Greenberg, Esq.; CRGO Law

(57) ABSTRACT

Embodiments of the present invention provide a method, system and computer program product for query generation from a previous result set. In an embodiment of the invention, a method for query generation from a previous result set is provided. The method includes identifying commonalities in a selection of records of a result set produced by a previously issued query against a database in a database management system executing in memory by at least one processor of a host server. The method further includes deriving a query from the identified commonalities that when executed against the database management system would produce the selection of records as the result set. Finally, the method includes storing the derived query for subsequent use in querying the database.

8 Claims, 1 Drawing Sheet

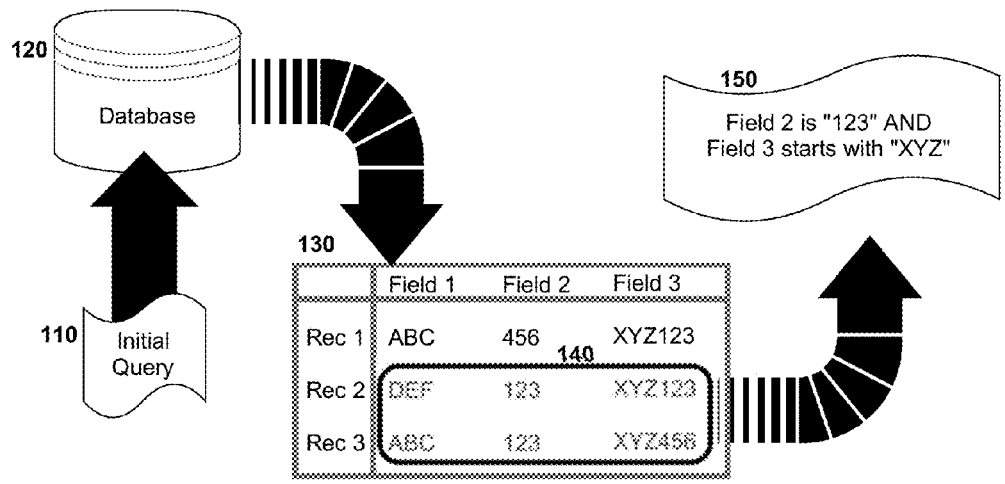
FIG. 1
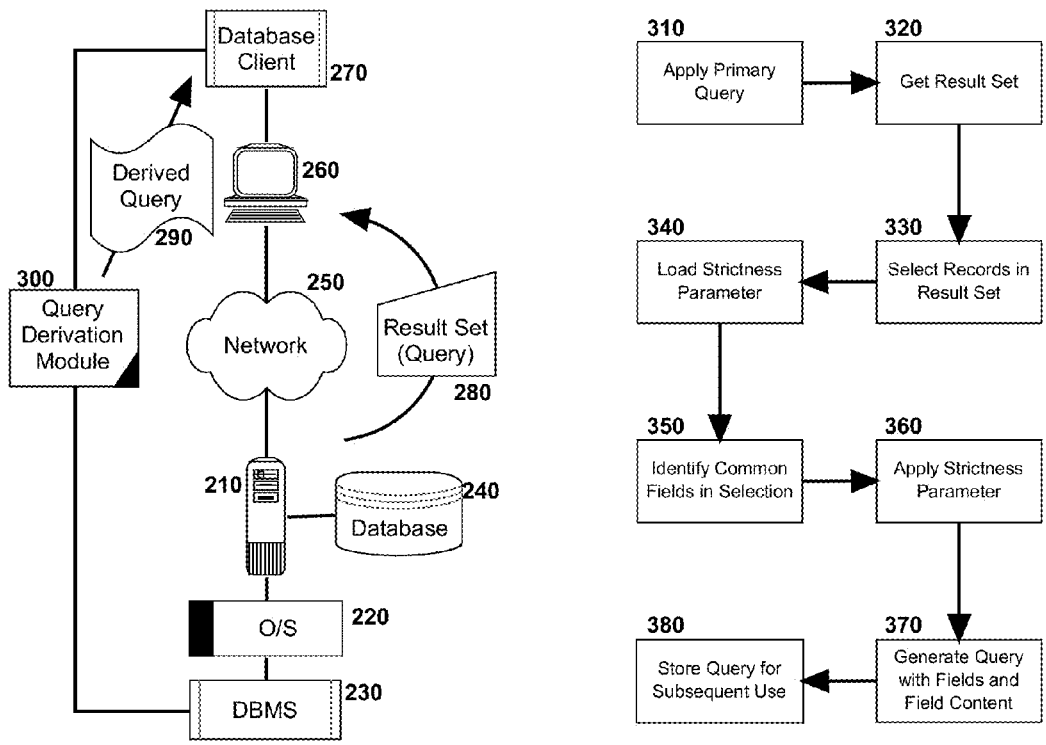
FIG. 2          FIG. 3

SIMPLIFIED QUERY GENERATION FROM PRIOR QUERY RESULTS

BACKGROUND OF THE INVENTION

1. Field of the Invention

The present invention relates to query processing and more particularly to query generation for querying large data sets.

2. Description of the Related Art

The database forms part and parcel of modern computing system. The database generally is a collection of electronically stored data. Integral to the utility of a database is the query mechanism. The query mechanism includes logic enabled to accept a textual query to be applied against the database in order to return a result set. The most basic query mechanism provides for the processing of a boolean query against the database. More advanced database queries conform to a robust syntax of available search commands, for example the structured query language (SQL).

Advanced query languages like SQL provide the sophisticated end user with powerful tool to mine massive volumes of data and to relate data in the database to expand the view of data beyond that apparent to the human mind. However, the complexity of query languages like SQL, place routine database querying beyond the reach of the casual end user.

In the past, the inability of the casual user to access the power of the query mechanism was of little consequence as only the information technologist enjoyed direct access to the data of the underlying database. However, the self-service model of computing has become prevalent and the end user now expects direct access to the data underlying the enterprise application. Even still, the complexities of the query mechanism remains challenging for the casual end user and inhibits the ability of the end user to access the data directly without enlisting the assistance of a professional.

BRIEF SUMMARY OF THE INVENTION

Embodiments of the present invention address deficiencies of the art in respect to query generation and provide a novel and non-obvious method, system and computer program product for query generation from a previous result set. In an embodiment of the invention, a method for query generation from a previous result set is provided. The method includes identifying commonalities in a selection of records of a result set produced by a previously issued query against a database in a database management system executing in memory by at least one processor of a host server. The method further includes deriving a query from the identified commonalities that when executed against the database management system would produce the selection of records as the result set. Finally, the method includes storing the derived query for subsequent use in querying the database.

In one aspect of the embodiment, identifying commonalities in a selection of records of a result set can include identifying individual fields in the records of the selection that contain at least a portion of identical content. As such, deriving a query from the identified commonalities that when executed against the database management system would produce the selection of records as the result set can include determining a strictness parameter indicating a degree of precision for the derived query and limiting a number of the individual fields expressed in the derived query according to the strictness parameter. Alternatively, deriving a query from the identified commonalities that when executed against the database management system would produce the selection of records as the result set, can include determining a strictness parameter indicating a degree of precision for the derived query and limiting a number of characters in content of at least one of the individual fields required to match in the derived query according to the strictness parameter.

In another embodiment of the invention, a database management data processing system can include a host server with at least one processor and memory and a database management system executing in the host server managing access to a database coupled to the host server. The system also can include a query derivation module communicatively linked to the database management system. The module can include program code that when executed by a computer is enabled to identify commonalities in a selection of records of a result set produced by a previously issued query against the database by the database management system, to derive a query from the identified commonalities that when executed against the database management system would produce the selection of records as the result set, and to store the derived query for subsequent use in querying the database. As before, the commonalities can include individual fields in the records of the selection that contain at least a portion of identical content.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for query generation from a previous result set;

FIG. 2 is a schematic illustration of a database management system configured for query generation from a previous result set; and, FIG. 3 is a flow chart illustrating a process for query generation from a previous result set.

DETAILED DESCRIPTION OF THE INVENTION

Embodiments of the invention provide for a method, system and computer program product for query generation from a previous result set. In accordance with an embodiment of the invention, a result set can be collected from a first query processed against a database. Subsequently, one or more records in the result set can be selected and commonalities between one or more fields the selected records can be identified. A query can be derived from the commonalities and stored for subsequent use as a query against the database. Of note, the breadth of the derived query can vary according to predetermined criteria, such as a number of fields with commonalities incorporated in the derived query, or the quantity of text of the commonalities in one or more of the fields incorporated in the derived query. Thus, the skilled artisan will recognize that the derivation of the query from the selection of records in the result set greatly simplifies access to database querying for the casual end user.

In further illustration, FIG. 1 pictorially depicts a process for query generation from a previous result set. As shown in FIG. 1, an initial query 110 can be applied against a database 120 to produce a result set 130. Each record in the result set can include data for different fields. A set of records 140 in the result set 130 can be selected and commonalities in the fields can be identified amongst the records of the set of records 140. For example, as shown in FIG. 1, the commonalities can include identical data in a field such as the data "123" of Field 2 of the second and third records of the set of records 140, or partial matching content such as the data "XYZ123" and "XYX456" of Field 3 of the second and third records of the set of records 140. Using the identified commonalities, a query 150 can be derived to produce the set of records 140. Thereafter, the derived query 150 can be stored for subsequent invocation and execution.

Of note, a strictness parameter (not shown) can be established to determine the nature of the derived query 150. In this regard, the strictness parameter can dictate the precision to which the derived query 150 is generated based upon the set of records 140. A less strict form of the strictness parameter may only require partial matching of content in only a subset of fields with determined to have commonalities, while a more strict form of the strictness parameter may require complete matching of content in all fields with the commonality of identical content. In this regard, with reference to FIG. 1, a less strict strictness parameter would result in the generation of a derived query as "Field 2" starts with "1", while a more strict strictness parameter would result in the generation of the derived query 150 as shown.

The process described in connection with FIG. 1 can be implemented within a database management data processing system. In this regard, FIG. 2 is a schematic illustration of a database management system configured for query generation from a previous result set. The system can include a host server 210 with at least one processor and memory coupled to a client computer 260 over computer communications network 250. The host server 210 can include an operating system 220 hosting the execution of a database management system 230 managing one or more databases 240 (only a single database shown for ease of illustration).

A database client 270 executing in the client computer 260 can provide a user interface to access data in the database 240. In this regard, the database client 270 can provide a simple query engine, or a more complex data driven application that formulates and issues database queries against the database 240 by way of the database management system 230. Of note, the database management system 230 can be coupled to query derivation module 300. The query derivation module 300 can reside in the host server 210, in the client computer 260, or in a separate, remotely accessible computing device (not shown).

The query derivation module 300 can include program code that when executed in memory by a computer such as the host server 210, can derive from a selection of records in a result set 280 to a prior query a derived query 290. Specifically, commonalities in one or more fields of the selected records can be identified and used to generate a query statement for the derived query 290. The extent and precision of the derived query 290 can vary according to a pre-established strictness parameter. In even yet further illustration of the operation of the query derivation module, FIG. 3 is a flow chart illustrating a process for query generation from a previous result set.

Beginning in block 310 an initial query can be applied to produce a result set in block 320. In block 330 records in the result set can be selected and in block 340 a strictness parameter can be determined. In block 350 common fields in the selection of records can be identified as those fields of the selected records including partially or fully matching content. In block 360, the strictness parameter can be applied to determine a degree of precision for expressing a query that when executed would produce the selection of records in a result set. Thereafter, in block 370 a derived query can be generated according to the common fields and content limited by the strictness parameter. Finally, in block 380 the derived query can be stored for subsequent use.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for query generation from a previous result set, the method comprising:

identifying commonalities in a selection of records of a result set produced by a previously issued query against a database in a database management system executing in memory by at least one processor of a host server, the identified commonalities including at least a portion of identical content in different individual fields in the selection of records of the result set according to a strictness parameter;

deriving a query from the identified commonalities based upon the strictness parameter, the strictness parameter indicating a degree of precision for the derived query and limiting a number of different individual fields expressed in the derived query;

generating the derived query with lower number of different individual fields using partial matching of the at least a portion of identical content in a subset of the different individual fields in the selection of records when the degree of precision specifies a less strict form of strictness parameter;

generating the derived query with higher number of different individual field using complete matching of the at least a portion of identical content in the different individual fields in the selection of records when the degree of precision specifies a more strict form of strictness parameter;

executing against the database management system, the derived query produces the selection of records of the result set produced by the previously issued query; and, storing the derived query for subsequent use in querying the database.

2. The method of claim 1, wherein identifying commonalities in the selection of records of the result set, comprises identifying different individual fields in the selection of records that contain at least a portion of identical content.

3. The method of claim 1, further comprises:

limiting a number of characters in content of at least one of the different individual fields required to match in the derived query according to the strictness parameter.

4. A database management data processing system comprising:

a host server with at least one processor and memory;

a database management system executing in the host server managing access to a database coupled to the host server; and, a query derivation module communicatively linked to the database management system, the module comprising program code that when executed by a computer is configured to:

identify commonalities in a selection of records of a result set produced by a previously issued query against the database by the database management system, the identified commonalities including at least a portion of identical content in different individual fields in the selection of records of the result set according to a strictness parameter, derive a query from the identified commonalities based upon the strictness parameter, the strictness parameter indicating a degree of precision for the derived query and limiting a number of different individual fields expressed in the derived query, generate the derived query with lower number of different individual fields using partial matching of the at least a portion of identical content in a subset of the different individual fields in the selection of records when the degree of precision specifies a less strict form of strictness parameter, generate the derived query with higher number of different individual field using complete matching of the at least a portion of identical content in the different individual fields in the selection of records when the degree of precision specifies a more strict form of strictness parameter, execute against the database management system, the derived query produces the selection of records of the result set produced by the previously issued query, and store the derived query for subsequent use in querying the database.

5. The system of claim 4, wherein the identified commonalities comprise individual fields in the selection of records that contain the at least a portion of identical content.

6. A computer program product for query generation from a previous result set, the computer program product comprising:

a computer readable storage medium having computer readable program code embodied therewith, the computer readable program code comprising:

computer readable program code for identifying commonalities in a selection of records of a result set produced by a previously issued query against a database in a database management system executing in memory by at least one processor of a host server, the identified commonalities including at least a portion of identical content in different individual fields in the selection of records of the result set according to a strictness parameter;

computer readable program code for deriving a query from the identified commonalities based upon the strictness parameter, the strictness parameter indicating a degree of precision for the derived query and limiting a number different individual fields expressed in the derived query;

computer readable program code for generating the derived query with lower number of different individual fields using partial matching of the at least a portion of identical content in a subset of the different individual fields in the selection of records when the degree of precision specifies a less strict form of strictness parameter;

computer readable program code for generating the derived query with higher number of different individual field using complete matching of the at least a portion of identical content in the different individual fields in the selection of records when the degree of precision specifies a more strict form of strictness parameter;

computer readable program code for executing against the database management system, the derived query produces the selection of records of the result set produced by the previously issued query; and, computer readable program code for storing the derived query for subsequent use in querying the database.

7. The computer program product of claim 6, wherein the computer readable program code for identifying commonalities in the selection of records of the result set, comprises computer readable program code for identifying different individual fields in the selection of records that contain at least a portion of identical content.

8. The computer program product of claim 6, further comprises:

computer readable program code for limiting a number of characters in content of at least one of the different individual fields required to match in the derived query according to the strictness parameter.

* * * * *